United States Patent [19]
Nishida et al.

[11] Patent Number: 5,714,700
[45] Date of Patent: Feb. 3, 1998

[54] HIGH STRENGTH SELF-LUBRICATING COMPOSITE MATERIAL FOR HIGH TEMPERATURE AND PRODUCTION METHOD OF THE SAME

[75] Inventors: Tokuhiko Nishida; Shoichi Sekiguchi; Toru Ono; Yuko Tsuya, all of Kawasaki, Japan

[73] Assignee: Nippon Steel Corporation, Tokyo, Japan

[21] Appl. No.: 732,317

[22] PCT Filed: Apr. 28, 1995

[86] PCT No.: PCT/JP95/00856

§ 371 Date: Dec. 18, 1996

§ 102(e) Date: Dec. 18, 1996

[87] PCT Pub. No.: WO95/30029

PCT Pub. Date: Nov. 9, 1995

[30] Foreign Application Priority Data

| Apr. 28, 1994 | [JP] | Japan | 6-092455 |
| Oct. 5, 1994 | [JP] | Japan | 6-241487 |
| Jan. 27, 1995 | [JP] | Japan | 7-011801 |

[51] Int. Cl.$^6$ .................................................. C22C 9/06
[52] U.S. Cl. .................. 75/231; 75/247; 419/33; 419/36; 419/39; 419/60
[58] Field of Search .............. 75/231, 247; 419/33, 419/36, 37, 39, 60

[56] References Cited

U.S. PATENT DOCUMENTS

| 3,956,146 | 5/1976 | Tsuya et al. | |
| 4,000,981 | 1/1977 | Sugafuji et al. | |
| 4,505,987 | 3/1985 | Yamada et al. | 428/553 |
| 5,256,494 | 10/1993 | Tanaka et al. | 428/552 |
| 5,288,457 | 2/1994 | Boegel | 420/470 |
| 5,326,384 | 7/1994 | Asada et al. | 75/231 |

FOREIGN PATENT DOCUMENTS

| 49-7108 | 1/1974 | Japan | B22F 3/00 |
| 62-196351 | 8/1987 | Japan | |
| 4-99834 | 3/1992 | Japan | |
| 5-320681 | 12/1993 | Japan | C10M 169/04 |
| WO95/30029 | 11/1995 | WIPO | |

*Primary Examiner*—Ngoclan Mai
*Attorney, Agent, or Firm*—Pollock, Vande, Sande & Priddy

[57] ABSTRACT

This invention provides a self-lubricating composite material which has excellent strength and oxidation resistnce at a high temperature and can be used in air and in vacuum, and a production method thereof, the composite material is a Cu—Ni—Sn type composite sintered body containing 20 to 70 vol % of mixed particles of graphite and $WS_2$ as the solid lubricant components and having a porosity of not greater than 25 vol %, and a matrix is a two-phase alloy comprising Cu—Ni alloy particles and an Sn single phase or an Sn—Ni intermetallic compound dispersed uniformly in the grain boundary of the alloy particles and firmly bonding them, and this matrix encompasses the solid lubricant particles. The matrix consists of 5 to 40 wt % of Ni, 4 to 15 wt % of Sn and the balance of Cu and unavoidable impurities as the alloy composition.

8 Claims, 5 Drawing Sheets

◨ SOLID LUBRICANT COMPOSITE GRANULAR SUBSTANCE

▨ Sn OR Sn-Ni INTERMETALLIC COMPOUND

⣿ Cu-Ni PARTICLES

☐ PORE

HIGH STRENGTH SELF-LUBRICATING COMPOSITE MATERIAL FOR HIGH TEMPERATURE AND PRODUCTION METHOD OF THE SAME

TECHNICAL FIELD

This invention relates to a self-lubricating composite material which is excellent in strength and in high temperature oxidation resistance, and which can be used in the atmosphere and in vacuum, and a production method of the same.

BACKGROUND ART

A large number of researches have been made since 1950th, mainly in U.S.A., for self-lubricating composite materials containing solid lubricants dispersed in a metal. Among them, composite materials using a Cu alloy as the matrix have been examined, and have been put into practical application, in Japan, too, as typified by a Cu—Sn type composite material. For example, Japanese Unexamined Patent Publication (Kokai) No. 62-196351 describes a technology relating to a self-lubricating composite material which comprises 10 to 80% of a bulk phase consisting of a lubricating material as a principal component and a bonding phase of a metal, wherein the bulk phase comprises a plurality of crystal grains of not greater than 30μ, which has a gain size of 30 to 1,000 μm. This prior art technology avoids the simultaneous addition of raw material powder of a lubricating material and powder as the metallic bonding phase, adds in advance a bonding adjuvant to the lubricating material and forms the bulk.

Japanese Unexamined Patent Publication (Kokai) No. 4-99834 discloses a technology which improves seizure resistance, wear resistance, etc, by adding graphite, molybdenum disulfide, $WS_2$, etc, to a Cu—Sn alloy. This prior art technology is directed to increase corrosion resistance by a lubricating oil by adding Pb.

However, the materials according to the prior art are all decomposed or oxidized at a high temperature, and the upper limit of their practical continuous use is 300° C. They also involve the problem that the mechanical strength and the yield strength are inferior.

Recently, needs have been increasing for high strength mechanical sliding members which are required to keep an excellent lubricating property in an oxidizing atmosphere in a high temperature zone of higher than 300° C., at which the lubricating oil cannot be used, and for high strength sliding members in a high vacuum atmosphere. In other words, technical development of a composite material capable of producing as economically as possible those self-lubricating composite materials which can exhibit the sliding characteristics irrespective of the atmosphere of use and the load condition as the solid lubricant, and a production method thereof, have been desired from the aspect of the lubrication property and safety, by examining the metal components of heat-resistant alloy systems for the matrix metal.

SUMMARY OF THE INVENTION

As described above, the self-lubricating composite material using the conventional Cu type alloy for the matrix cannot be applied in the high temperature atmosphere for which lubrication-free sliding members are originally required. The self-lubricating composite material has low mechanical characteristics and for this reason, too, its application to structural materials is also limited.

As a result of examinations of the kinds and quantities of solid lubricants, optimization of matrix metals and production methods so as to obtain a self-lubricating composite material which can withstand the use at a high temperature and which has improved high temperature sliding characteristics, the present invention aims at providing a self-lubricating composite material excellent in mechanical and frictional characteristics up to 700° C. in vacuum and up to 500° C. in the atmosphere, and a production method of such a self-lubricating composite material. The gist of the present invention for accomplishing the object described above resides in the following points.

(1) A high strength self-lubricating composite material for a high temperature characterized in that the composite material is a Cu—Ni—Sn type composite sintered body containing 20 to 70 vol % of mixed particles of graphite and $WS_2$ particles as solid lubricant components, and having a porosity of not greater than 25 vol %, and has a structure such that a matrix has a two-phase alloy comprising Cu—Ni alloy particles and an Sn single phase or an Sn—Ni intermetallic compound dispersed uniformly in the grain boundary of the alloy particles and firmly bonding the alloy particles, and the matrix alloy encompasses the solid lubricant particles.

(2) A high strength self-lubricating composite material for a high temperature according to the item (1), wherein the matrix consists of 5 to 40 wt % of Ni, 4 to 15 wt % of Sn and the balance of Cu and unavoidable impurities as an alloy composition.

(3) A high strength self-lubricating composite material according to the item (1), wherein the grain size of each of the Cu—Ni particles of the matrix alloy and the Sn single phase or the Sn—Ni intermetallic compound particles is 5 to 100 μm.

(4) A high strength self-lubricating composite material for a high temperature according to the item (1), wherein the proportion of graphite and $WS_2$ as the solid lubricant components is 15:1 to 1:1 in terms of a volume ratio, the lubricant particles have a spherical or platelet form, and the grain size is 10 to 500 μm.

(5) A high strength self-lubricating composite material for a high temperature according to the item (1), wherein the composite material has an excellent self-lubricating property, can be used as a sliding member in vacuum and in the atmosphere without oiling, and can be used at 500° C. in air and at 700° C. in vacuum as the heat resistance thereof.

(6) A production method of a high strength self-lubricating composite material for a high temperature, which is a Cu—Ni—Sn type composite sintered body containing graphite particles and $WS_2$ particles as the solid lubricant components thereof, comprising the steps of: granulating mixed powder of the graphite particles and the $WS_2$ particles; mixing Cu—Ni alloy powder and Sn powder with the resulting solid lubricant granules to prepare a mixture; press-molding the mixture; and thereafter sintering the press-molded article in a non-oxidizing atmosphere or in vacuum.

(7) A production method of a high strength self-lubricating composite material for a high temperature according to the item (6), wherein the granulation step is carried out by adding a binder to the mixture of the graphite particles and the $WS_2$ particles.

(8) A production method of a high strength self-lubricating composite material according to the item (6), wherein the press-molding step is carried out by using a metal mold press or a hydrostatic pressure press at a molding pressure of 100 to 500 MPa.

BRIEF DESCRIPTION OF THE DRAWINGS

FIGS. 3(A) to (D) are graphs, each showing the difference of mechanical characteristics between the present invention and the prior art using Cu—Sn as the matrix, wherein FIG. 3(A) shows the relationship between a room temperature compressive strength and a graphite content, FIG. 3(B) shows the relationship between a high temperature compressive strength and the graphite content, FIG. 3(C) shows the relationship between a yield strength and the graphite content and FIG. 3(D) shows the relationship between an elastic modulus and the graphite content.

FIGS. 4(A) and (B) show the comparison of the frictional coefficient in the atmosphere and in vacuum between the present invention and the prior art, wherein FIG. 4(A) shows the relation between the frictional coefficient and the temperature in the atmosphere and FIG. 4(B) shows the relation between the frictional coefficient and the temperature in vacuum.

BEST MODE FOR CARRYING OUT THE INVENTION

Figure 1:
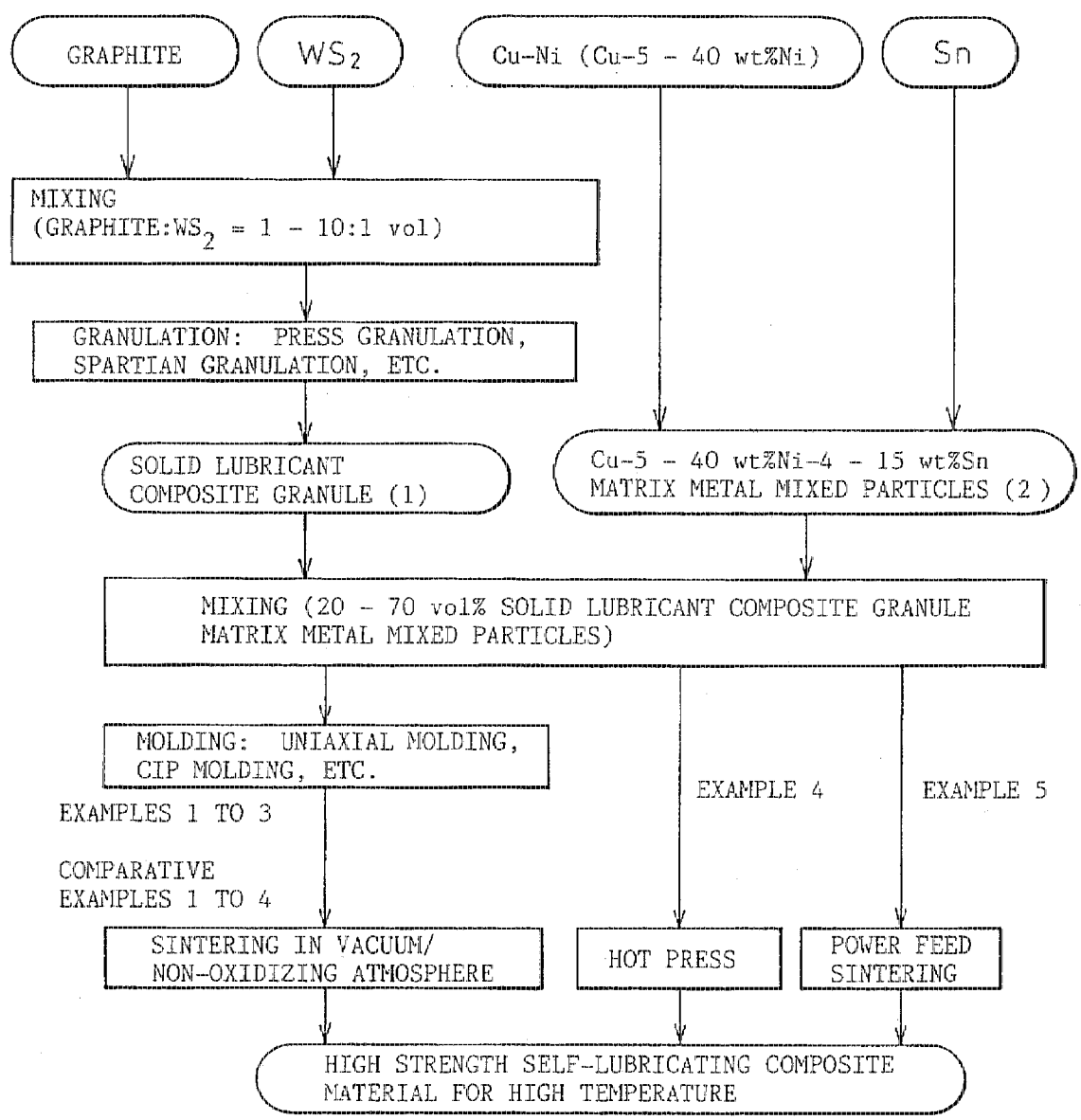
FIG. 1 is a flowchart of a production process of a self-lubricating composite material according to the present invention.

The reason why a Cu—Ni—Sn ternary alloy system is selected as the first characterizing feature of the present invention is that these elements do not react with graphite and $WS_2$ as the solid lubricants at a sintering temperature and at the temperature of use, and are excellent in sinterability and in oxidation resistance in the high temperature atmosphere. It is one of the greatest reasons because the Cu—Ni—Sn alloy as the matrix can improve much more the mechanical characteristics, particularly the elastic modulus, the yield point and the high temperature strength, than the Cu—Sn alloy, by excluding positively other alloy systems.

For, the sintering temperature becomes higher than 1,000° C. in the case of the Cu—Ni alloy that is ordinarily used as the matrix. the reaction of the alloy elements with $WS_2$ and graphite at this temperature, and the intended self-lubricating property cannot be obtained.

On the other hand, the addition of Sn can lower the sintering temperature below 800° C., though the oxidation resistance is lowered, as well. Further, it causes the Cu—Ni alloy particles to strongly bond with one another, and in this point, the addition of Sn is extremely effective. As a result, the matrix has by far excellent oxidation resistance and mechanical strength than the conventional Cu—Sn alloy.

In other words, Cu—Ni as the matrix of the composite material according to the present invention is more excellent in the oxidation resistance and the mechanical strength than the Cu—Sn alloy, etc, as the conventional matrix metals, covers the periphery of the solid lubricant particles to thereby cut them off from air and restricts oxidation of the solid lubricant components inside the composite material. At a temperature below 800° C. as the sintering temperature of the present invention, however, Cu—Ni as the single substance is hardly sintered. When Sn is added, the liquid phase occurs at the sintering temperature, uniformly permeates into Cu—Ni and the grain boundary of the solid lubricant particles, and plays the role of an adhesive between the particles. Sn or a part of Sn solidified at the time of cooling reacts with Ni and forms a Ni—Sn intermetallic compound, and this compound can be recognized under the uniformly precipitated state on the Cu—Ni grain boundary.

Next, as the second characterizing feature, the present invention selects the mixed grains of graphite and $WS_2$. The selection of these materials can obtain excellent sliding characteristics irrespective of the atmosphere of use and the load condition, is extremely economical from the aspect of the production cost, and can accomplish a light weight as the material characteristics. $WS_2$ has excellent performance as the solid lubricant, but its oxidation resistance in the atmosphere is 425° C. at the highest. This temperature is by about 100° C. lower than that of graphite. Further, $WS_2$ itself is an extremely expensive material. On the other hand, graphite has a smaller weight than $WS_2$ and a higher oxidation resistance and is more economical. However, its lubricating property is extremely sensitive to the atmosphere and the load condition, and its lubricating characteristics are believed unavailable particularly in vacuum.

The present invention drastically improves the sliding characteristics of graphite by adding a predetermined amount of $WS_2$ to graphite, and accomplishes the self-lubrication effect particularly in vacuum, too.

$WS_2$ so added is encompassed by graphite, and its oxidation is prevented even at a high temperature. The effect of the improvement of the sliding characteristics by the addition of $WS_2$ can be observed to a mixing ratio of about 1:1, but even when $WS_2$ is added in a greater amount, the remarkable improvement effect cannot be observed. On the contrary, the problems such as the drop of the oxidation resistance, the increase of the weight and the cost, etc, occur afresh.

Hereinafter, the reasons for the limitation in the present invention will be explained concretely.

The matrix according to the present invention comprises the Cu—Ni—Sn alloy containing 5 to 40 wt % of Ni, 4 to 15 wt % of Sn and the balance of Cu and unavoidable impurities, and the graphite particles and the $WS_2$ particles in an amount of 20 to 70 vol % in total are uniformly dispersed as the solid lubricant components. The proportion of Ni in the alloy is set to 5 to 40 wt % because, if Ni is less than 5 wt %, both the oxidation resistance and the mechanical strength cannot be remarkably improved in comparison with the conventional Cu—Sn alloy system.

On the other hand, when the addition amount of Ni exceeds 40 wt %, sinterability drops. The proportion of Sn in the alloy is limited to 4 to 15 wt % because, if it is less than 4 wt %, sinterability of the alloy drops, and if it exceeds 15 wt %, the oxidation resistance at the high temperature drops. A more preferred range for Ni and Sn is 20 to 30 wt % and 8 to 12 wt %, respectively.

The reason why the graphite particles and the $WS_2$ particles are used at the mixing ratio of 15:1 to 1:1 as the slid lubricant components is as follows.

Graphite is more ecumenical than other solid lubricants, and its oxidation resistance is superior and next to that of BN. However, the lubrication characteristics of graphite depend on the atmospheric condition, and it is believed that graphite fails to exhibit its lubrication property particularly in vacuum. Therefore, when a small amount of $WS_2$ whose lubrication characteristics less depend on the atmosphere and which has excellent lubrication characteristics in vacuum is added, the application in the atmosphere and in vacuum becomes possible. Mixing of $WS_2$ is also essentially necessary in order to accomplish a low coefficient of friction at a low load.

The mixing ratio of graphite and $WS_2$ is limited to 15:1 to 1:1 for the following reason. If $WS_2$ is smaller than 15:1, the effect of the addition of $WS_2$ cannot be obtained, and if it is greater than 1:1, the drop of the high temperature characteristics due to oxidation/decomposition of $WS_2$ becomes remarkable. Preferably, therefore, the proportion of graphite and $WS_2$ is 15:1 to 1:1 by the volume ratio, and a more preferred range is 5 to 10:1.

Though the mean grain size of graphite and $WS_2$ is not particularly limited, it is preferably 10 to 60 μm from the aspect of the strength and lubrication characteristics of the sintered body.

The amount of addition of the solid lubricant components is limited to 20 to 70 vol % for the following reason. If the amount of addition is less than 20 vol %, the lubrication characteristics become insufficient and if it exceeds 70 vol %, the improvement of the lubrication characteristics is small and the drop of the strength is great. The addition amount is determined depending on the condition of use but when high strength is required, the amount of addition is 20 to 35 wt %, and when lubrication characteristics are required, it is preferably 50 to 70 vol %.

As to the porosity, the mechanical strength and the oxidation resistance becomes higher when the porosity is as small as possible. However, the materials of the present invention are difficultly sinterable from the beginning, and contain generally about 10 to about 20 vol % of pores. If the materials contain more than 25% of pores, the mechanical strength and the oxidation resistance become remarkably lower. Therefore, the porosity is limited to this range. In order not to leave the pores by normal pressure sintering as in the present invention, the amount of Sn as the liquid phase component may be increased, but the increase of Sn is not desirable because it invites deterioration of the oxidation resistance and the mechanical strength. For these reasons, though the pores are structural element of the composite material fine structure of the present invention, they are originally not desirable.

The structure of the composite material according to the present invention is the Cu—Ni—Sn type composite sintered body containing 20 to 70 vol % of the mixed particles of graphite and $WS_2$ as the solid lubricant components and having not greater than 25 vol % of porosity, wherein the matrix comprises a two-phase alloy consisting of the Cu—Ni alloy particles and the Sn single phase or the Sn—Ni intermetallic compound dispersed uniformly in the grain boundary of the Cu—Ni alloy particles and firmly bonding them, and the matrix alloy encompasses the solid lubricant particles. The grain size of the Cu—Ni particles of the matrix alloy and the Sn single phase or the Sn—Ni intermetalltic compound particles is 5 to 150 μm and preferably, 5 to 100 μm, the lubricant particles have the spherical or platelet-like form and the grain size of 10 to 500 μm, the volume proportion of the solid lubricant components is 20 to 70 vol % with respect to the sum of the matrix and the solid lubricants, and the porosity is not greater than 25 vol %. As the characteristics of the composite material, it has excellent self-lubricating property, can be used as a slidable member in vacuum and in the atmosphere without oiling, is heat resistant and can be used at 500° C. in air and at 700° C. in vacuum.

For, the oxidation resistance of the solid lubricant is the rate-determining factor in the atmosphere and the rate is determined in vacuum by softening of the matrix metal. This temperature is by far higher than the temperature of 300° C. in the atmosphere of the Cu—Sn ally type self-lubricating composite material that has been used in the past. The composite material of the present invention is by far superior to the conventional material in the aspect of the mechanical characteristics such as the strength, the yield strength, the hardness, and so forth. For example, the compressive strength is as high as 3 to 5 times.

Next, the production method according to the second invention will be explained.

Predetermined amounts of graphite having a grain size of 2 to 100 μm and $WS_2$ having a grain size of 2 to 100 μm are weighted and are sufficiently mixed by a mixer such as a ball mill. A suitable binder is added to this mixed powder, and the mixture is sufficiently kneaded. The mixture is then granulated to a grain size of 10 to 500 μm. The binders must be those which do not react with $WS_2$ and graphite at the degreasing temperature. Granulation methods such as net granulation, Spartan granulation, spray-drying, etc, may be employed for the granulation. Further, a press granulation method presses mixed powder not containing the binder, then pulverizes the resulting molded article and classifies them.

In the way described above, the solid lubricant particles dispersed in the component material are produced. By the way, this production process prepares in advance the solid lubricant mixed particles to be dispersed in the composite material. The grain size of the starting powder is not much important, and in short, both of the materials need be uniformly mixed. If the starting materials are too small, however, uniform mixing becomes difficult, and if they are too great, it becomes difficult to attain uniformity during granulation of particles having a grain size of maximum 500 μm.

Next, Cu—Ni alloy powder and Sn powder are added to the solid lubricant mixed particles granulated by the method described above, and they are uniformly mixed. Mixing can be made by a wet system or a dry system, but it is preferred to employ a method or a medium which minimizes oxidation. The mean grain size of the alloy component raw material powder is preferably from 5 to 30 μm from the aspect of moldability and sinterablility.

Next, the mixed power is press-molded by a mold press or a hydrostatic press. The molded article is preferably as compact as possible, and the molding pressure is preferably 100 to 500 MPa. Any molding method can be used so long as it is the one used for ordinary powder metallurgy.

Finally, the molded article is sintered at 700° to 800° C. in a non-oxidizing atmosphere such as Ar, in a reducing atmosphere such as $CO/CO_2$ or in vacuum. The sintering time is from about 30 to about 180 minutes. Here, the optimum tempering temperature is determined by the content of the solid lubricant and by the composition of the matrix metal. The sintering temperature becomes lower (up to 700° C.) when the content of the solid lubricant is smaller, Ni of the matrix is smaller and Sn is greater and becomes higher (up to 800° C.) when the content of the solid lubricant is greater, Ni in the matrix is greater and Sn is smaller. To prevent the reaction between $WS_2$ and the matrix metal, however, the sintering temperature must not exceed 800° C. The sintering temperature varies depending on sinterability of the molded article, and compactness cannot be accomplished if the molded article is retained for the time less than 30 minutes. When it is retained for more than 180 minutes, on the other hand, the grain growth becomes so remarkable that the strength of the sintered body drops. Therefore, a more preferred retention time is 30 to 90 minutes.

The sintering temperature is determined by the content of the solid lubricant. When content of the solid lubricant is small, the temperature must not exceed 700° C., and when it is great, the temperature must not exceed 800° C., so as to prevent the decomposition of $WS_2$ and the reaction with the matrix metal.

Hereinafter, the present invention will be explained further concretely by Examples thereof.

EXAMPLES

The starting materials used for Examples of the present invention and Comparative Examples are as follows.

graphite: platelet particles having mean grain size of 50 μm $WS_2$: platelet particles having mean grain size of 2 μm Cu—Ni alloy: 70wt % Cu—30wt % Ni alloy particle having mean grain size of 15 μm Sn: spherical particles having mean grain size of 10 μm Cu: spherical particles having mean grain size of 10 μm FIG. 1 shows the production flow.

The compositions of Examples of the present invention and Comparative Examples, the production conditions and the mechanical properties of the resulting sintered bodies are altogether tabulated in Table 1. Here, the measurement methods of the characteristics are as follows. First, the porosity and the bulk specific gravity were measure by using kerosine in accordance with JIS R2205. The compressive strength at room temperature, the yield point and the elastic modulus were measured by using a testpiece having a diameter of 10 mm and a height of 10 mm at a crosshead speed of 0.5 mm/min. The compressive strength was measured at 150°, 250°, 350° and 450° C. in the atmosphere by using the same testpiece and the pressurization speed as described above.

As to the sliding characteristics, the load dependence of the coefficient of friction, sliding speed dependence and the ambient temperature dependence of the coefficient of friction in the atmosphere and in vacuum are altogether tabulated in Table 2. The measuring method of each frictional coefficient dependence is as follows. First, the load dependence of the coefficient of friction was measured by using a two-line system tribometer and SUS 304 as a mating material at a constant sliding speed of 0.4 m/sec. The load dependence was measured by using the same apparatus at a constant load of 20 kgf. On the other hand, the ambient temperature dependence of the coefficient of friction in the atmosphere and in vacuum was measured by a pin-on-disc method and using SUS 304 as a disc material at a constant speed of 0.4 m/sec and a constant load of 2.2 kgf.

Example 1

Graphite particles and $WS_2$ particles were weighted into a volume ratio of 4:1 and were uniformly dry mixed by a ball mill to obtain a uniform mixed powder. This mixed powder was uniaxially molded at a pressure of 300 MPa, and was then pulverized and classified to obtain solid lubricant composite granules (1) having a mean grain size of 50 μm.

The solid lubricant granules and the matrix metal mixed particles (2) weighted so that the proportion of the Cu—Ni alloy and Sn became 9:1 in the weight ratio, were weighted so that the proportion of (1) and (2) became 25:75 by a volume ratio, and were uniformly mixed by using a ball mill. The mixture was then molded at a pressure of 300 MPa by a mold press, and the resulting molded article was buried in coke coarse particles and was heated at 740° C. for 60 minutes in vacuum to obtain a sintered body.

Figure 2:
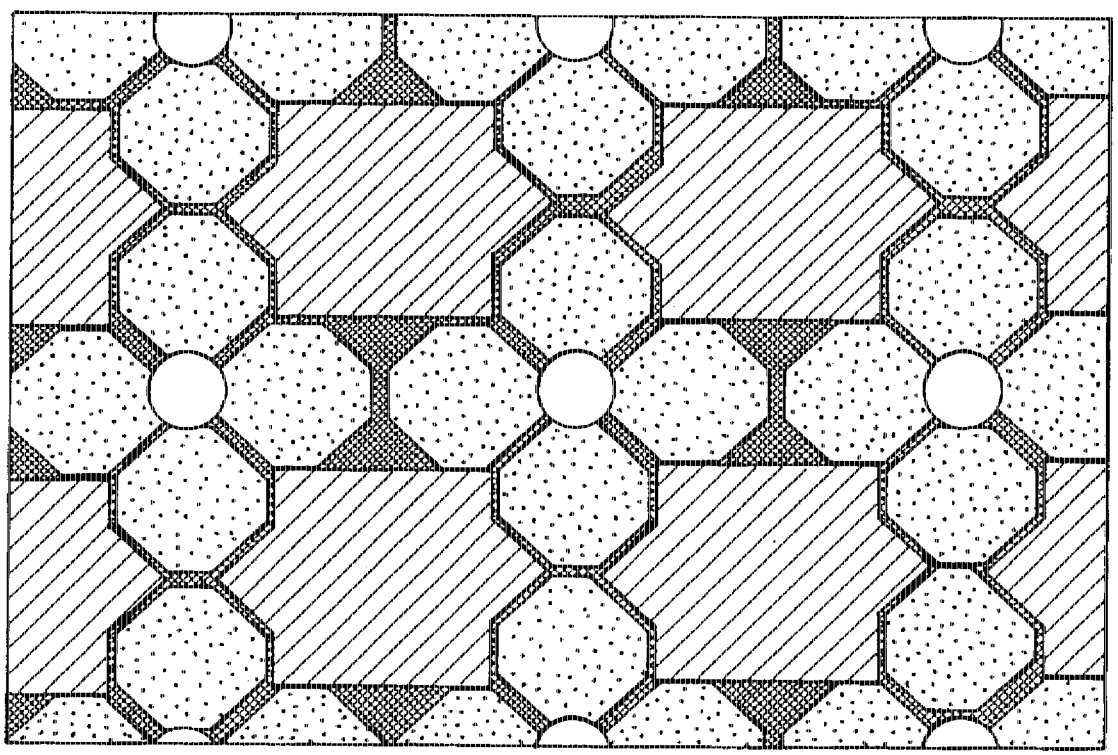
FIG. 2 is a conceptual view showing a fine structure of a self-lubricating composite material according to the present invention.

FIG. 2 shows the conceptual view of the fine structure of the resulting sintered body. This drawing in a conceptual view showing only the disposition of the constituent elements of the composite material but does not illustrate its shape. It can be seen from the drawing that Cu—Ni alloy particles as the main matrix were firmly bonded by Sn or the Sn—Ni alloy of the grain boundary, and the solid lubricant granules of graphite and $WS_2$ were uniformly dispersed in the matrix metal. In comparison with comparative Example 1 which did not contain Ni but contained the same volume ratio of the solid lubricant components, it could be understood that the elastic modulus and the yield point became about three times. It could be understood also that the strength was remarkably improved at a high temperature exceeding 350° C. Further, the coefficient of friction was lower and the sliding characteristics were more improved under almost all the load, speed and temperature conditions in comparison with Comparative Example 1 containing the same volume ratio of the solid lubricant components.

Comparative Example 1

In order to examine the addition effect of Ni into the matrix, a self-lubricating composite material using 90wt % Cu—10wt % Sn not containing Ni as the matrix metal and having the same composition as that of Example 1 other than Ni was produced under the same condition as that of Example 1.

Example 2

A self-lubricating composite material having a volume mixing ratio of graphite and $WS_2$ of 7:1 and a volume ratio of a solid lubricant component and a metal matrix of 40:60 was molded in the same way as in Example 1, and a sintered body was obtained at 750° C. for 60 minutes. Drastic improvement could be recognized in the elastic modulus, the yield point and the high temperature strength in the same way as in Example 1 in comparison with Comparative Example 2 containing the solid lubricant components in the same volume ratio. The coefficient of friction, too, was lower in almost all the conditions in comparison with comparative Example 2.

Comparative Example 2

To examine the Ni addition effect to the matrix, a self-lubricant composition material having the same composition as that of Example 2 with the exception that 90 wt % Cu—10 wt % Sn not containing Ni was used as the matrix metal, was produced under the same condition as that of Example 2.

Example 3

A self-lubricating composite material having a volume mixing ratio of graphite and $WS_2$ of 10:1 and a volume ratio of the solid lubricant and the metal matrix of 55:45 was molded in the same way as in Example 1, and a sintered body was obtained at 770° C. for 60 minutes. In comparison with Comparative Example 3 not containing Ni, drastic improvements could be observed in the elastic modulus, the yield point and the high temperature strength in the same way as in Examples 1 and 2.

Figure 3A:
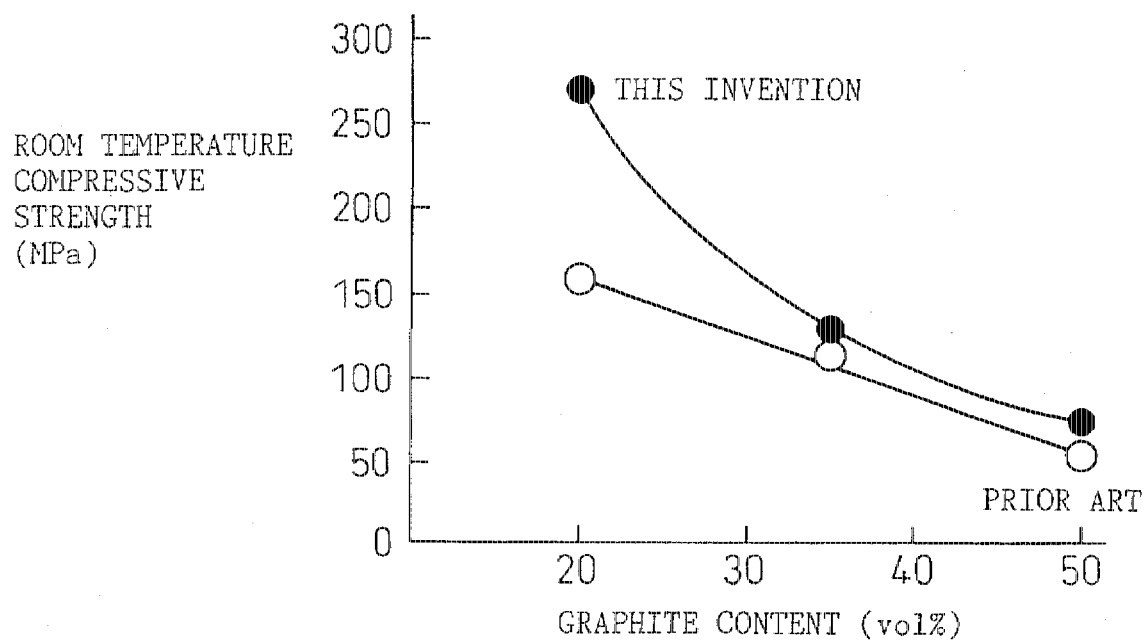
Figure 3B:
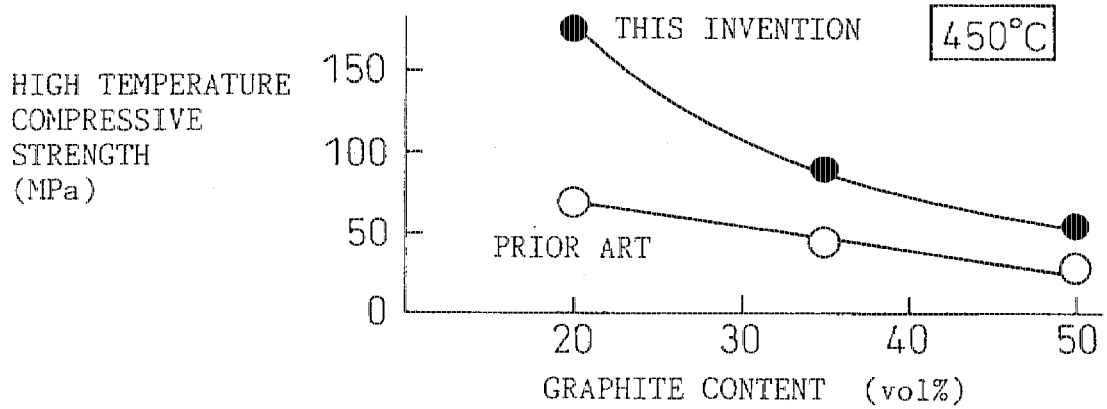
Figure 3C:
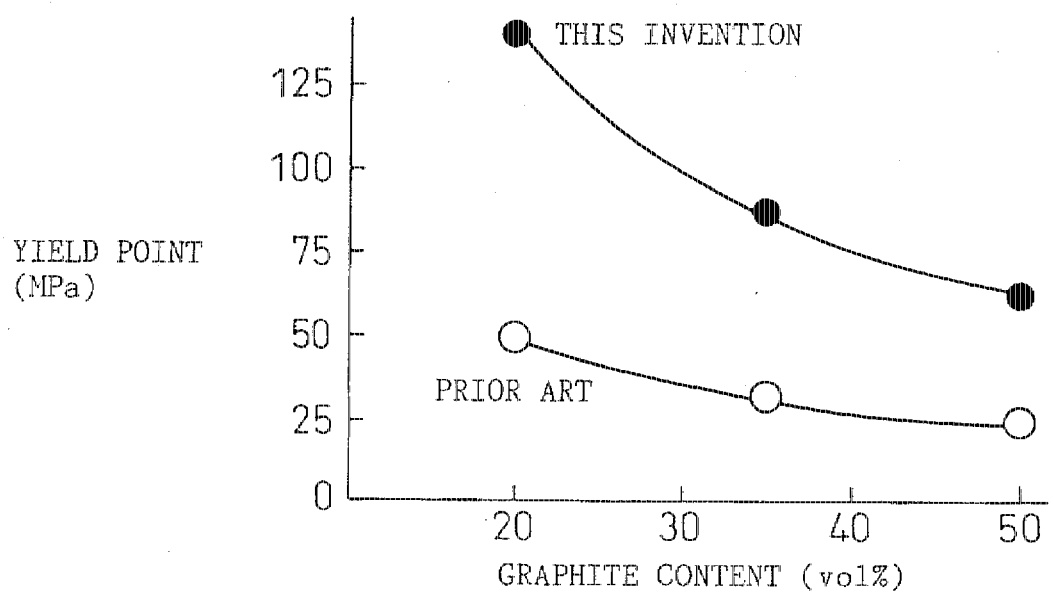
Figure 3D:
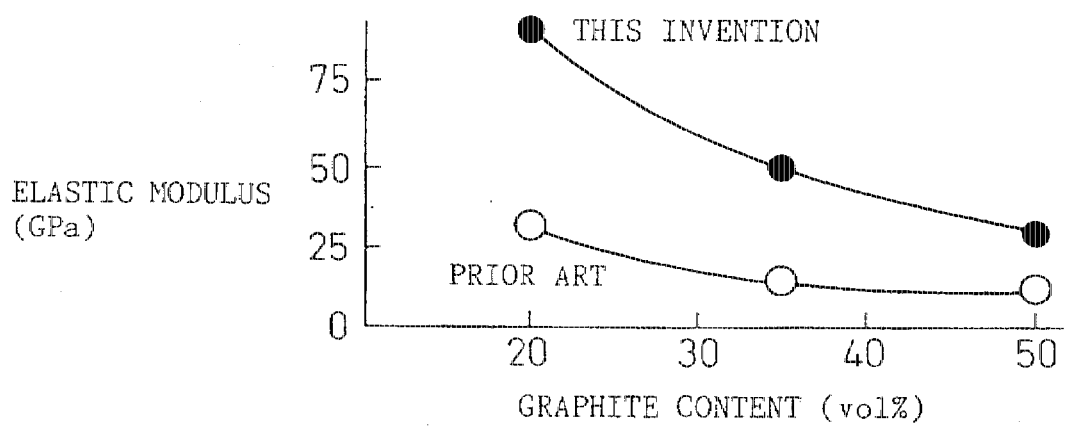

To further clarify the effect of the Ni addition on the mechanical characteristics, FIGS. 3(A) to 3(D) show Examples 1 to 3 of the present invention and Comparative Examples 1 to 3 according to the prior art by using the volume fraction of the solid lubricant as the parameter. In FIGS. 3(A) to 3(D), FIG. 3(A) shows the compressive strength at room temperature, FIG. 3(B) shows the compressive strength at high temperature, FIG. 3(C) shows the yield point and FIG. 3(D) shows the elastic modulus, in connection with the graphite content, respectively. It can be appreciated from these diagrams that the mechanical characteristics of the composite material can be drastically improved by the addition of Ni.

Figure 4A:
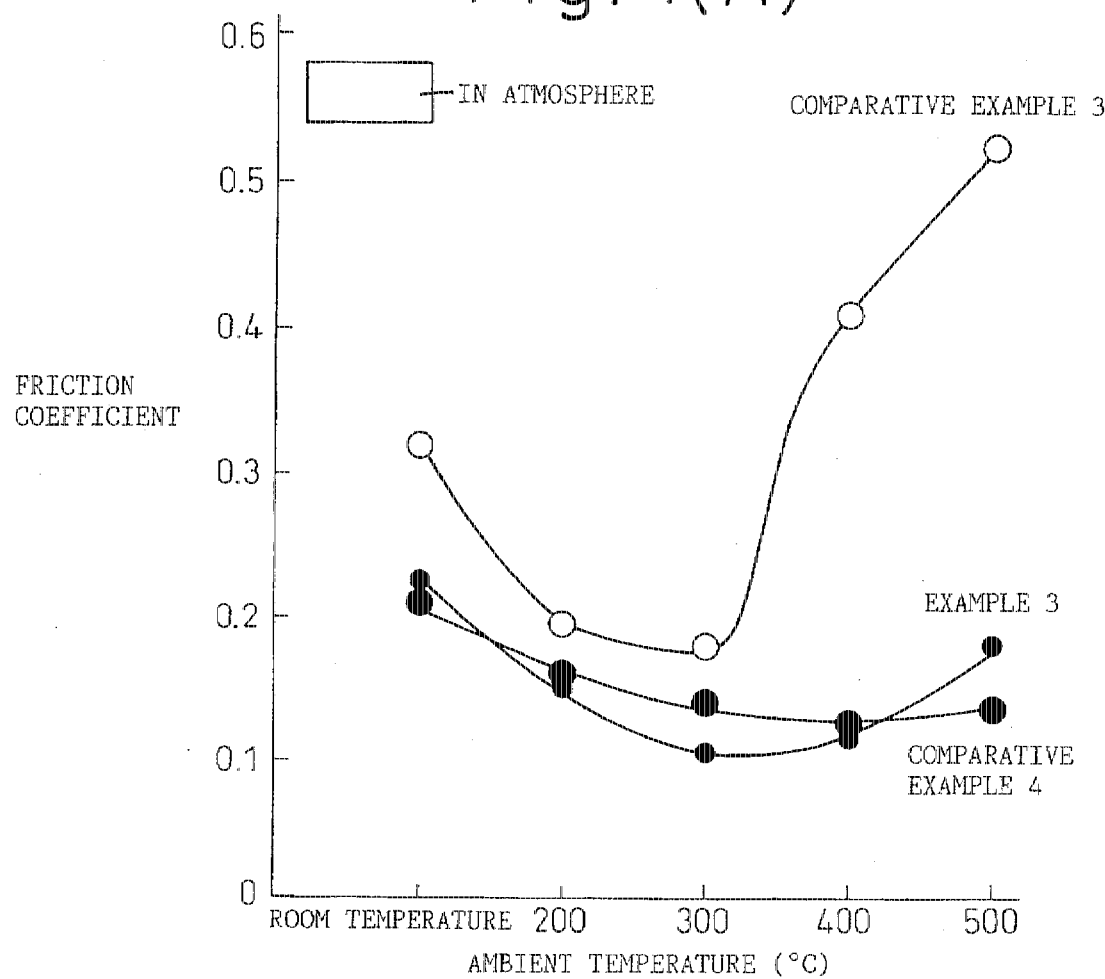
Figure 4B:
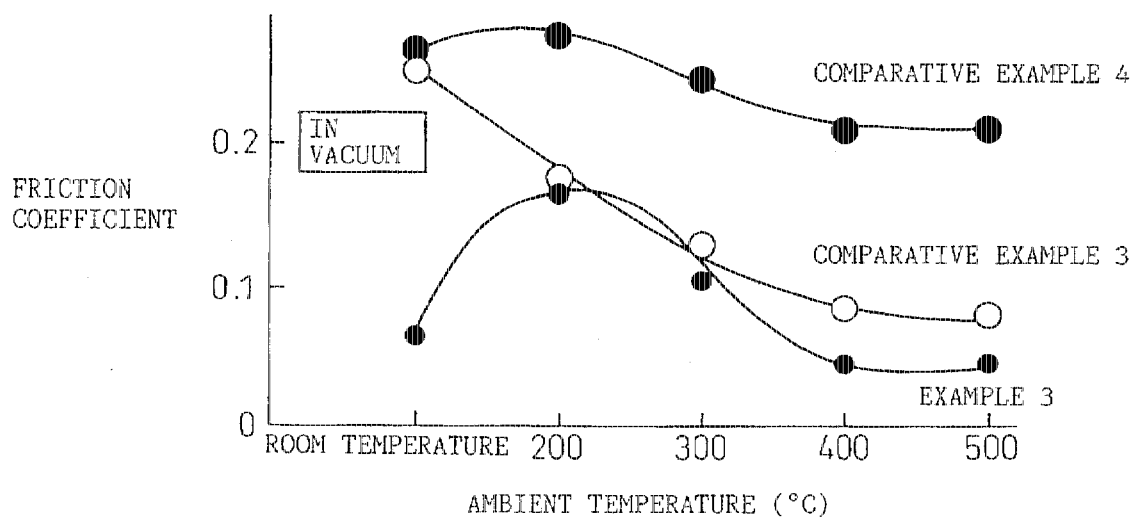

FIGS. 4(A) and 4(B) show the temperature dependence of the coefficient of friction in the atmosphere and in vacuum, respectively. In FIGS. 4(A) and 4(B), FIG. 4(A) shows the relation between the coefficient of friction and the temperature in the atmosphere and FIG. 4(B) shows the relation in vacuum. It can be appreciated from these graphs that the self-lubricating composite material according to the present invention exhibits the excellent sliding characteristics of the coefficient of friction of not greater than 0.2 in both the atmosphere and vacuum within a broad temperature range of from room temperature to 500° C. In the case of Comparative Example 3 in which the matrix did not contain Ni, the matrix metal was oxidized at a high temperature of not lower than 300° C. when the composite material was used in the atmosphere, and the coefficient of friction drastically increased.

In the case of Comparative Example 4 in which $WS_2$ was not contained as the solid lubricant component, the composite material exhibited a low coefficient of friction approximate to that of Example 3 in the atmosphere, but the coefficient of friction exceeded 0.2 within all the temperature range in vacuum.

Comparative Example 3

To examine the effect of the Ni addition to the matrix, a self-lubricant composite material having the same composition as that of Example 3 with the exception that 90 wt % Cu—10 wt % Sn not containing Ni was used as the matrix metal, under the same condition as that of Example 3.

Comparative Example 4

To examine the effect due to the existence and absence of $WS_2$ in the solid lubricant components, a self-lubricating composite material containing only 55 vol % of graphite in the same matrix as that of Example 3 was produced.

Example 4

Mixed powder of the solid lubricant composite granules and the matrix metal particles, that had the same composition and were subjected to the same powdering treatment as those of Example 3, were packed into a carbon die which was 60 mm in diameter and 90 mm in height and the inner surface of which was coated with boron nitride. The mixture was hot pressed in argon at 40 MPa and 630° C. for 60 minutes to obtain a sintered body. In comparison with Example 3 wherein the product was produced by vacuum sintering, a sintered body having a smaller porosity was obtained by hot press, and this method was suitable particularly for a material containing a large amount of solid lubricant components.

Example 5

Mixed powder of the same solid lubricant composite granules and the matrix metal, that had the same composition and were subjected to the same powdering treatment as those of Example 3, were packed into a carbon die, and a D.C. current of 800 A was caused to flow between carbon push rods for about 40 seconds. The temperature of the sintered body at this time was 700° C. and accomplishment of complete compactness was confirmed by a contraction coefficient meter. According to this Example, the compact self-lubricating composite material having the same compactness as when hot press was used could be obtained, though the sintering time was short.

Industrial Applicability

According to the present invention, the matrix uses the Cu—Ni—Sn alloy, graphite and the $WS_2$ particles are uniformly dispersed as the solid lubricant components in the matrix, and they are encompassed by the Sn single phase or the Sn—Ni intermetallic compound to form the fine structure. In this way, the present invention can obtain a self-lubricating composite material which improves the oxidation resistance, has a higher strength and a higher yield strength than those obtained before, and can be used not only in the atmosphere but also in vacuum.

TABLE 1

| measurement item | Example 1 | Example 2 | Example 3 | Example 4 | Example 5 | Comparative Example 1 | Comparative Example 2 | Comparative Example 3 | Comparative Example 4 |
| --- | --- | --- | --- | --- | --- | --- | --- | --- | --- |
| measurement method | vacuum sintering | vacuum sintering | vacuum sintering | hot press | power feed sintering | vacuum sintering | vacuum sintering | vacuum sintering | vacuum sintering |
| matrix composition wt % | | | | | | | | | |
| Cu | 63 | 63 | 63 | 63 | 63 | 90 | 90 | 90 | 63 |
| Ni | 27 | 27 | 27 | 27 | 27 | — | — | — | 27 |
| Sn | 10 | 10 | 10 | 10 | 10 | 10 | 10 | 10 | 10 |
| lubricant vol % | | | | | | | | | |
| graphite | 4 | 7 | 10 | 10 | 10 | 4 | 7 | 10 | 1 |
| $WS_2$ | 1 | 1 | 1 | 1 | 1 | 1 | 1 | 1 | 0 |
| lubricant proportion vol % | 25 | 40 | 55 | 55 | 55 | 25 | 40 | 55 | 55 |
| bulk specific gravity | 6.25 | 5.54 | 4.73 | 5.32 | 5.34 | 5.96 | 5.16 | 4.67 | 4.11 |
| porosity (%) | 19.6 | 12.7 | 10.6 | 3.0 | 1.9 | 19.5 | 20.4 | 13.8 | 15.8 |
| elastic modulus (GPa) | 91 | 50 | 29 | 48 | 45 | 34 | 14 | 13 | 23 |
| yield point (MPa) | 138 | 87 | 63 | 108 | 107 | 49 | 33 | 24 | 26 |
| compressive strength MPa | | | | | | | | | |
| room temp. | 268 | 131 | 76 | 118 | 117 | 162 | 113 | 56 | 70 |
| 150° C. | 266 | 135 | 68 | 109 | 109 | 282 | 111 | 49 | 71 |
| 250° C. | 242 | 123 | 67 | 101 | 99 | 232 | 105 | 61 | 71 |
| 350° C. | 225 | 118 | 62 | 95 | 91 | 146 | 87 | 52 | 73 |
| 450° C. | 176 | 91 | 54 | 91 | 87 | 72 | 44 | 32 | 70 |

TABLE 2

| measurement item | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| load dependence speed condition 0.4 m/s | | | | | | | | | |
| 2 kgf | 0.275 | 0.263 | 0.160 | 0.143 | 0.150 | 0.475 | 0.468 | 0.255 | 0.210 |
| 5 kgf | 0.230 | 0.200 | 0.160 | 0.120 | 0.142 | 0.272 | 0.190 | 0.180 | 0.190 |
| 10 kgf | 0.280 | 0.273 | 0.220 | 0.121 | 0.133 | 0.435 | 0.335 | 0.170 | 0.205 |
| 20 kgf | 0.233 | 0.170 | 0.110 | 0.098 | 0.102 | 0.360 | 0.165 | 0.120 | 0.146 |
| 40 kgf | 0.210 | 0.152 | 0.085 | 0.092 | 0.110 | 0.310 | 0.143 | 0.102 | 0.113 |
| speed dependence load condition 20 kgf | | | | | | | | | |
| 0.2 m/s | 0.300 | 0.210 | 0.168 | 0.139 | 0.138 | 0.360 | 0.283 | 0.195 | 0.245 |
| 0.4 m/s | 0.233 | 0.170 | 0.110 | 0.098 | 0.102 | 0.360 | 0.165 | 0.120 | 0.146 |
| 0.8 m/s | 0.145 | 0.143 | 0.070 | 0.085 | 0.090 | 0.310 | 0.123 | 0.073 | 0.128 |
| 1.6 m/s | 0.168 | 0.085 | 0.043 | 0.059 | 0.063 | 0.158 | 0.070 | 0.048 | 0.095 |
| 2.4 m/s | 0.095 | 0.035 | 0.028 | 0.021 | 0.024 | 0.129 | 0.055 | 0.040 | 0.052 |
| temp. dependence speed condition 0.4 m/s load condition 10 kgf | | | | | | | | | |
| in vacuum | | | | | | | | | |
| room temp. | 0.090 | 0.085 | 0.065 | 0.062 | 0.061 | — | — | 0.248 | 0.265 |
| 200° C. | 0.059 | 0.055 | 0.164 | 0.079 | 0.068 | — | — | 0.175 | 0.277 |
| 300° C. | 0.045 | 0.032 | 0.105 | 0.075 | 0.074 | — | — | 0.128 | 0.244 |
| 400° C. | 0.027 | 0.023 | 0.046 | 0.070 | 0.065 | — | — | 0.085 | 0.210 |
| 500° C. | 0.064 | 0.032 | 0.046 | 0.074 | 0.068 | — | — | 0.078 | 0.212 |
| in atmosphre | | | | | | | | | |
| room temp. | 0.270 | 0.198 | 0.162 | 0.092 | 0.099 | — | — | 0.318 | 0.210 |
| 200° C. | 0.172 | 0.141 | 0.135 | 0.085 | 0.082 | — | — | 0.191 | 0.163 |
| 300° C. | 0.150 | 0.112 | 0.098 | 0.076 | 0.076 | — | — | 0.182 | 0.138 |
| 400° C. | 0.129 | 0.101 | 0.084 | 0.070 | 0.068 | — | — | 0.409 | 0.126 |
| 500° C. | 0.121 | 0.103 | 0.082 | 0.063 | 0.071 | — | — | 0.523 | 0.133 |

We claim:

1. A high strength self-lubricating composite material for a high temperature characterized in that said composite material is a Cu—Ni—Sn type composite sintered body containing 20 to 70 vol % of mixed particles of graphite and $WS_2$ particles as solid lubricant components, and having a porosity of not greater than 25 vol %, and has a structure such that a matrix has a two-phase alloy comprising Cu—Ni alloy particles and an Sn single phase or an Sn—Ni intermetallic compound dispersed uniformly in the grain boundary of said alloy particles and firmly bonding said alloy particles, and said matrix alloy encompasses said solid lubricant particles.

2. A high strength self-lubricating composite material for a high temperature according to claim 1, wherein said matrix consists of 5 to 40 wt % of Ni, 4 to 15 wt % of Sn and the balance of Cu and unavoidable impurities as an alloy composition.

3. A high strength self-lubricating composite material according to claim 1, wherein the grain size of each of said Cu—Ni particles of said matrix alloy and said Sn single phase or said Sn—Ni intermetallic compound particles is 5 to 100 μm.

4. A high strength self-lubricating composite material for a high temperature according to claim 1, wherein the proportion of graphite and $WS_2$ as said solid lubricant components is 15:1 to 1:1 in terms of a volume ratio, said lubricant particles have a spherical or platelet form, and the grain size is 10 to 500 μm.

5. A high strength self-lubricating composite material for a high temperature according to claim 1, wherein said composite material has an excellent self-lubricating property, can be used as a sliding member in vacuum and in the atmosphere without oiling, and can be used at 500° C. in air and at 700° C. in vacuum as the heat resistance thereof.

6. A production method of a high strength self-lubricating composite material for a high temperature, which is a Cu—Ni—Sn type composite sintered by containing graphite particles and $WS_2$ particles as the solid lubricant components thereof, comprising the steps of:

granulating mixed powder consisting of said graphite particles and said $WS_2$ particles;

mixing Cu—Ni alloy powder and Sn powder with the resulting solid lubricant granules to prepare a mixture;

press-molding said mixture; and thereafter sintering the press-molded article in a non-oxidizing atmosphere or in vacuum.

7. A production method of a high strength self-lubricating composite material for a high temperature according to claim 6, wherein said granulation step is carried out by adding a binder to said mixture of said graphite particle and said $WS_2$ particles.

8. A production method of a high strength self-lubricating composite material according to claim 6, wherein said press-molding step is carried out by using a metal mold press or a hydrostatic pressure press at a molding pressure of 100 to 500 MPa.

* * * * *